United States Patent Office 3,014,883
Patented Dec. 26, 1961

3,014,883
TRANSPARENT RUBBER VULCANIZATE
Ralph F. Wolf, Akron, Ohio, assignor, by mesne assignments, to Pittsburgh Plate Glass Company
No Drawing. Filed Mar. 21, 1957, Ser. No. 647,478
13 Claims. (Cl. 260—33.6)

This invention relates to novel transparent rubber compositions. It is not difficult to make transparent natural rubber compositions without filler. However, the physical properties of these pure gum stocks are poor. While they have had some usage in drug sundries and in "crepe" soling, the general use of these materials has been comparatively limited. It is well known that the physical properties of rubber can be improved by adding reinforcing pigments. However, in the course of compounding rubber with such pigments, the rubber becomes opaque even when only a small amount of pigment has been added.

According to the present invention, novel transparent rubber having high strength properties have been prepared. These rubbers are vulcanizates of rubber and reinforcing concentrations of finely divided, hydrated silica having an average ultimate particle size in the range of 0.02 to 0.025 micron and having an index of refraction of substantially 1.46, i.e., 1.45 to 1.465. Such rubbers have an opacity below 50 percent. Such opacity is determined using a Hunter reflectometer. Rubber sheets 0.075 inch in thickness cured between aluminum surfaces to provide clean surfaces are used for testing the opacity. The sheet is placed against a white background and reflectance measured employing a green Tristimulus filter to obtain green light reflectance. The sheet is placed against a black background and reflectance measured in the same way. Percent opacity of the sheet is then the ratio of reflectance with black background to reflectance with white background multiplied by 100.

While silica has been used as a reinforcing pigment for many years, few silicas produce a transparent rubber. One type of silica which has been marketed and which has a particle size in the range of 0.03 to 0.04 micron, and which has an index of refraction of 1.44, yields opaque rather than transparent rubber compositions.

In order to achieve the desired transparency, it is also necessary to have a proper selection of the other components of the rubber compound so that none of such components impart opacity or seriously impair the transparency of the product. The exact formulation depends to some degree upon the nature of the rubber used. Transparent compositions have been prepared according to this invention using natural rubber, butadiene-styrene copolymers, particularly the oil-extended copolymers, butadiene-acrylonitrile copolymers, and butyl rubber.

In the compounding of natural rubber, elemental sulfur has a bad effect upon the transparency thereof and should be kept at a low level, not in excess of about 0.5 to 2 parts by weight per 100 parts by weight of rubber. In order to effect satisfactory vulcanization of natural rubber stocks, it is also important that such stocks contain small amounts of an organic sulfide which supplies sulfur for vulcanization. Enough of such sulfide should be provided to ensure production of a well cured stock. The amount required normally is about 0.5 to 3 parts by weight per part by weight of rubber. Best of the polysulfides suitable for this purpose are the dimorpholine polysulfides, such as 4,4'-dithiodimorpholine. Other liquid organic polysulfide vulcanization agents which may be used are the liquid aliphatic polysulfides, such as the liquid ethylene polysulfides. A typical compound of this character is that known as "VA-7," manufactured by the Thiokol Chemical Corporation. Most of the compounds of this character are polymeric products produced by interaction of the an alkylene dichloride, such as ethylene dichloride and like olefin dichlorides, with sodium sulfide, ethylene polysulfide, diethyl pentasulfide, alkyl phenol sulfides, and the like.

The accelerator combination used is an important factor in the compounding of transparent natural rubber. The most satisfactory combination consists of a thiazole primary accelerator, a small amount of a dithiocarbamate acting as a secondary accelerator, and an amine activator. Typical thiazoles which are suitable are: n-cyclohexyl-2-benzothiazole sulfenamide (Santocure), tertiary butyl-2-benzothiazole, sulfenamide, mercaptobenzothiazole, mercaptobenzothiazyl disulfide, and the like.

Typical dithiocarbamates are zinc dithiocarbamate, zinc dimethyl dithiocarbamate, zinc n-pentamethylene dithiocarbamate, piperidine pentamethylene dithiocarbamate, selenium diethyl dithiocarbamate, tellurium diethyl dithiocarbamate, zinc diethyl dithiocarbamate, zinc dibutyl dithiocarbamate, and the like.

By far the best results are obtained when the amine accelerator is hexamethylene tetramine. Other amines which can be used with somewhat poorer transparency are triethanol amine, ethylene diamine, diethanol amine, monoethanol amine, tripropanol amine, dipropanol amine, tri-methylene diamine, and like water soluble amines and alkylol amines. Another accelerator combination which can be used together with diethylene glycol or like polyhydric alcohol and an amine, such as hexamethylene tetramine, is dipentamethylene-thiuram-tetrasulfide.

The above materials may be used in small proportions, up to about 1 part by weight per 100 parts by weight of rubber.

Ethylene bis butyl phenol, such as 2,2'-methylene bis (4-ethyl-6-tertiary butyl phenol) and 2,2'-bis (4-methyl-6-tertiary butyl phenol) are especially effective antioxidants useful in this composition. Amounts of such antioxidants are in the range of about ½ to 1.5 parts by weight per 100 parts by weight of rubber.

The composition normally contains a small amount, from 0.5 to 1.5 parts by weight, of finely divided zinc oxide to 100 parts by weight of rubber. Fatty acids, such as stearic acid and the like, also may be present.

The following are typical recipes which are useful in the preparation of transparent natural rubber:

TABLE I

| | Parts by weight |
|---|---|
| Pale crepe | 100 |
| Silica having an index of refraction of 1.46 | 39 |
| Zinc oxide | 1 |
| N-cyclohexyl-2-benzothiazole sulfenamide (Santocure) | 1 |
| Zinc dimethyl dithiocarbamate | 0.25 |
| Hexamethylene tetramine | 1 |
| Antioxidant (2246) [2,2'-methylene-bis(4-methyl-6-tertiary-butyl phenol)] | 2 |
| Sulfur | 1 |
| 4,4'-dithiodimorpholine (Sulfasan R) | 1 |
| Stearic acid | 1 |

TABLE II

|  | Parts by weight | |
|---|---|---|
|  | (A) | (B) |
| Pale Crepe | 100 | 100 |
| Silica | 39 | 39 |
| Zinc Oxide | 1 | 1 |
| Benzothiazyl disulfide (MBTS) | 1 | 1 |
| Zinc dimethyl dithiocarbamate | 0.25 | 0.25 |
| Hexamethylene tetramine | 1 | 1 |
| Antioxidant (2246) [2,2'-methylene-bis(4-methyl-6-tertiary-butyl phenol)] | 2 | 2 |
| Stearic Acid | 1 | 1 |
| Sulfur | 1 | 1 |
| Organic polysulfide (VA-7) | | 2 |
| 4,4'-dithiodimorpholine (Sulfasan R) | 1 | |

TABLE III

|  | Parts by weight | | |
|---|---|---|---|
|  | (A) | (B) | (C) |
| Pale Crepe | 100 | 100 | 100 |
| Silica | 39 | 39 | 39 |
| Zinc Oxide | 1 | 1 | 1 |
| Zinc dimethyl dithiocarbamate | 0.25 | 0.25 | 0.25 |
| Hexamethylene tetramine | 1 | 1 | 1 |
| Antioxidant (2246) [2,2'-methylene-bis(4-methyl-6-tertiary-butyl phenol)] | 2 | 2 | 2 |
| Sulfur | 1 | 1 | 1 |
| 4,4'-dithiodimorpholine (Sulfasan R) | 1 | 1 | 1 |
| Stearic Acid | 1 | 1 | 1 |
| N-cyclohexyl-2-benzothiazole sulfenamide (Santocure) | 1 | | |
| Benzothiazyl disulfide (MBTS) | | 1 | |
| 2-mercaptobenzothiazole (MBT) | | | 1 |

The compounding of the rubber with the various ingredients can be effected in the conventional manners and vulcanization at the conventional temperatures, for example, 287° F.

In the preparation of styrene-butadiene transparent rubber compositions, it is important that so-called "non-staining copolymers" be used. By far the best transparent rubbers of this character have been produced using the oil-extended butadiene-styrene synthetic rubbers. A typical compound which has been found to be most suitable is the compound known as "Plioflex 1778" which is a butadiene-styrene copolymer extended with a naphthenic oil. Other equivalent copolymers also may be used, including GR–S 1503 (butadiene-styrene copolymer containing 20 percent by weight of the copolymer of bound styrene), GR–S 1006 (butadiene-styrene copolymer containing 23.5 percent by weight of the copolymer of bound styrene), Krylene–NS (a butadiene-styrene copolymer produced at low temperature and containing a non-staining, non-discoloring antioxidant and fatty acids), and the like.

It is especially advantageous to use an oil-extended butadiene-styrene copolymer in which the oil has an index of refraction of about 1.450 to 1.465. Surprisingly, when a polymer of this character, such as Plioflex 1778, is used, transparency is actually improved with increasing load.

The following is a typical recipe and shows the general properties of the compounds obtained. Note that the opacity decreases as the loading increases.

TABLE IV

|  | Parts by weight | | | | | | | |
|---|---|---|---|---|---|---|---|---|
|  | (A) | (B) | (C) | (D) | (E) | (F) | (G) | (H) |
| Pale Crepe | 100 | 100 | 100 | 100 | 100 | 100 | 100 | 100 |
| Silica | 39 | 39 | 39 | 39 | 39 | 39 | 39 | 39 |
| Zinc Oxide | 1 | 1 | 1 | 1 | 1 | 1 | 1 | 1 |
| 2-mercaptobenzothiazole (MBT) | 1 | 1 | 1 | 1 | 1 | 1 | 1 | 1 |
| Zinc dimethyl dithiocarbamate | 0.25 | 0.25 | 0.25 | 0.25 | 0.25 | 0.25 | 0.25 | 0.25 |
| Hexamethylene tetramine | 1 | 1 | 1 | 1 | 1 | 1 | 1 | 1 |
| Sulfur | 1 | 1 | 1 | 1 | 1 | 1 | 1 | 1 |
| 4,4'-dithiodimorpholine (Sulfasan R) | 1 | 1 | 1 | 1 | 1 | 1 | 1 | 1 |
| Stearic Acid | 1 | 1 | 1 | 1 | 1 | 1 | 1 | 1 |
| Antioxidant (2246) [2,2'-methylene-bis(4-methyl-6-tertiary-butyl phenol)] | 2 | | | | | | | |
| Aminox (diphenylamine-acetone reaction product) | | 2 | | | | | | |
| Antox (butyraldehyde-aniline condensation product) | | | 2 | | | | | |
| Agerite gel (mixture of octylated diphenylamines with a selected petroleum wax) | | | | 2 | | | | |
| Agerite Stalite (octylated diphenylamines) | | | | | 2 | | | |
| Deenax (2,6-ditertiary-butyl-4-methyl phenol) | | | | | | 2 | | |
| Ionol (2,6-ditertiary-butyl-4-methyl phenol) | | | | | | | 2 | |
| Santowhite [4,4'-butylidene-bis(6-tertiary butyl-m-cresol)] | | | | | | | | 2 |

TABLE V

TEST RECIPES

|  | Parts by weight | |
|---|---|---|
|  | (A) | (B) |
| Plioflex 1778 | 100 | 100 |
| Silica | (¹) | (¹) |
| Zinc Oxide | 1 | 1 |
| Zinc Salt of mercaptobenzothiazole | 0.75 | 0.9 |
| DPG (dyphenylguanidine) | 1.5 | 1.8 |
| Hexamethylene tetramine | 1 | 1.2 |
| Sulfur | 1.75 | 1.75 |
| Diethylene Glycol | 3 | 3 |
| Stearic Acid | 1 | 1 |

¹ As shown.

TABLE V—Continued

| Silica Loading, Parts per Hundred Rubber | Test Recipe | Mins. Cure at 292° F. | Modulus 300% | Tensile | Elong. | Duro. A Hardness 0" | Duro. A Hardness 30" | Tear, lbs./inch | Opacity, Percent |
|---|---|---|---|---|---|---|---|---|---|
| 48.75 (25 vols.) | (A) | 10 | 710 | 1,880 | 620 | 60 | 50 | 250 | |
| | | 15 | 720 | 1,890 | 620 | 60 | 51 | 220 | |
| | | 20 | 730 | 2,070 | 630 | 63 | 53 | 220 | 40.9 |
| | | 30 | 720 | 2,080 | 640 | 64 | 55 | 230 | |
| | | 45 | 820 | 2,040 | 590 | 65 | 55 | 250 | |
| 58.5 (30 vols.) | (A) | 10 | 860 | 1,970 | 600 | 68 | 58 | 300 | |
| | | 15 | 880 | 2,070 | 600 | 69 | 59 | 290 | |
| | | 20 | 880 | 2,180 | 600 | 70 | 60 | 320 | 40.7 |
| | | 30 | 890 | 2,220 | 600 | 71 | 60 | 300 | |
| | | 45 | 970 | 2,190 | 570 | 73 | 64 | 320 | |
| 68.25 (35 vols.) | (A) | 10 | 1,130 | 2,050 | 560 | 74 | 65 | 330 | |
| | | 15 | 1,170 | 2,250 | 560 | 76 | 68 | 340 | |
| | | 20 | 1,100 | 2,270 | 580 | 78 | 69 | 360 | 34.4 |
| | | 30 | 1,100 | 2,400 | 600 | 80 | 72 | 370 | |
| | | 45 | 1,180 | 2,400 | 580 | 83 | 74 | 340 | |
| 78 (40 vols.) | (B) | 10 | 1,440 | 2,290 | 560 | 80 | 72 | 440 | |
| | | 20 | 1,620 | 2,300 | 470 | 83 | 77 | 430 | |
| | | 30 | 1,680 | 2,310 | 460 | 83 | 77 | 410 | 25.0 |
| | | 45 | 1,750 | 2,320 | 440 | 87 | 80 | 410 | |
| | | 60 | 1,860 | 2,350 | 420 | 88 | 81 | 420 | |
| 97.5 (50 vols.) | (B) | 10 | 1,510 | 2,000 | 520 | 92 | 88 | 400 | |
| | | 20 | 1,590 | 1,980 | 470 | 94 | 90 | 400 | |
| | | 30 | 1,560 | 1,970 | 470 | 93 | 90 | 340 | 24.6 |
| | | 45 | 1,560 | 1,960 | 470 | 95 | 92 | 310 | |
| | | 60 | 1,570 | 1,860 | 410 | 94 | 92 | 290 | |

In the case of the vulcanization agent, sulfur alone in amounts ranging from 1 to 2 parts per 100 parts by weight of the synthetic rubber is satisfactory as a vulcanizing agent. The presence of polysulfide vulcanization agents results in an inferior product.

For acceleration of the butadiene-styrene copolymers, the above mentioned thiazoles, described in connection with the acceleration of natural rubber, have been found to be effective. However, in the case of the butadiene-styrene copolymers, the thiocarbamates are normally omitted and the thiazoles are normally used in connection with the amines, preferably hexamethylene tetramine, mentioned above. Also, small amounts of water soluble polyhydric alcohol, normally in the range of 1 to 5 parts by weight per 100 parts by weight of rubber, are used.

The following are typical recipes which may be used and the properties thereof:

TABLE VI

*Comparison of four thiazoles in thiazole-guanidine-amine-glycol acceleration of transparent styrene-butadiene rubber compounds*

TEST RECIPE

| | Parts by weight |
|---|---|
| GR-S 1503 | 100 |
| Silica (20 vols.) | 39 |
| Zinc Oxide | 1 |
| Thiazole | 0.75 |
| DPG (diphenylguanidine) | 1.5 |
| Hexamethylene tetramine | 1 |
| Diethylene Glycol | 3 |
| Sulfur | 1.75 |
| Stearic Acid | 1 |

| Thiazole | Mins. Cure at 292° F. | Modulus 300% | Tensile | Elong. | Duro. A Hardness 0" | Duro. A Hardness 30" | Tear, lbs./inch | Opacity, Percent |
|---|---|---|---|---|---|---|---|---|
| Zinc Salt of mercaptobenzothiazole. | 10 | 490 | 2,490 | 770 | 57 | 47 | 260 | |
| | 15 | 480 | 2,900 | 800 | 58 | 48 | 240 | |
| | 20 | 490 | 2,870 | 790 | 58 | 48 | 260 | 48.5 |
| | 30 | 500 | 2,860 | 770 | 62 | 52 | 260 | |
| | 45 | 570 | 2,840 | 730 | 62 | 52 | 230 | |
| | 60 | 580 | 2,810 | 740 | 62 | 51 | 250 | |
| 2-mercapto benzothiazole (MBT) | 10 | 520 | 2,520 | 770 | 56 | 46 | 250 | |
| | 15 | 520 | 2,760 | 770 | 58 | 48 | 240 | |
| | 20 | 500 | 2,600 | 740 | 58 | 48 | 260 | 54.3 |
| | 30 | 560 | 2,670 | 740 | 62 | 51 | 240 | |
| | 45 | 550 | 2,740 | 730 | 62 | 52 | 250 | |
| | 60 | 630 | 2,410 | 670 | 62 | 52 | 240 | |
| Benzothiazyl disulfide (MBTS). | 10 | 370 | 2,700 | 820 | 57 | 47 | 230 | |
| | 15 | 420 | 2,770 | 790 | 57 | 47 | 220 | |
| | 20 | 440 | 2,830 | 790 | 57 | 47 | 210 | 62.8 |
| | 30 | 420 | 2,770 | 770 | 59 | 51 | 220 | |
| | 45 | 450 | 2,760 | 760 | 62 | 52 | 220 | |
| | 60 | 440 | 2,930 | 760 | 62 | 52 | 230 | |
| N-cyclohexyl-2-benzothiazole sulfenamide (Santocure). | 10 | 320 | 2,410 | 880 | 56 | 44 | 220 | |
| | 15 | 330 | 2,540 | 860 | 56 | 45 | 230 | |
| | 20 | 360 | 2,530 | 840 | 56 | 46 | 220 | 63.0 |
| | 30 | 360 | 2,710 | 830 | 58 | 48 | 210 | |
| | 45 | 370 | 2,770 | 810 | 58 | 47 | 220 | |
| | 60 | 390 | 2,780 | 790 | 58 | 48 | 230 | |

TABLE VII

*Properties of silica in transparent styrene-butadiene rubber compounds*

TEST RECIPES

| (A) | Parts by weight | (B) | Parts by weight |
|---|---|---|---|
| Plioflex 1778 | 100 | GR-S 1503 | 100 |
| Silica | 58.5 | Silica | 39 |
| Zinc Oxide | 1 | Zinc Oxide | 1 |
| Zinc salt of mercapto benzothiazole | 0.75 | Zinc salt of mercapto benzothiazole | 0.75 |
| DPG (diphenylguanidine) | 1.5 | DPG (diphenylguanidine) | 1.5 |
| Hexamethylene tetramine | 1 | Hexamethylene tetramine | 1 |
| Diethylene Glycol | 3 | Diethylene Glycol | 3 |
| Sulfur | 1.75 | Sulfur | 1.75 |
| Stearic Acid | 1 | Stearic Acid | 1 |

| Silica | Mins. Cure at 292° F. | Modulus 300% | Tensile | Elong. | Duro. A Hardness 0″ | Duro. A Hardness 30″ | Tear, lbs./inch | Opacity, Percent |
|---|---|---|---|---|---|---|---|---|
| (A) (30 vols. in Plioflex 1778) | 10 | 940 | 2,260 | 630 | 67 | 56 | 330 | 31.4 |
|  | 15 | 970 | 2,400 | 620 | 67 | 58 | 330 |  |
|  | 20 | 940 | 2,470 | 620 | 68 | 59 | 320 |  |
|  | 30 | 900 | 2,580 | 650 | 72 | 61 | 310 |  |
|  | 45 | 1,050 | 2,470 | 600 | 72 | 62 | 320 |  |
| (B) (20 vols. in GR-S 1503) | 10 | 500 | 2,520 | 760 | 65 | 51 | 280 | 56.9 |
|  | 15 | 560 | 2,490 | 710 | 65 | 51 | 270 |  |
|  | 20 | 500 | 2,520 | 740 | 65 | 51 | 280 |  |
|  | 30 | 520 | 2,540 | 730 | 65 | 51 | 280 |  |
|  | 45 | 550 | 2,880 | 730 | 65 | 52 | 290 |  |

The vulcanization of butadiene-styrene rubber compounds preferably is effected at a temperature of about 270° F. However, temperatures as high as 320° F. may be used if desired, although a slight decrease in transparency is observed in such cases.

Typical recipes for compounding transparent nitrile rubber (butadiene-acrylonitrile copolymer) are the following:

TABLE VIII

| | Parts by weight |
|---|---|
| Hycar (butadiene-acrylonitrile copolymer) | 100 |
| Silica (20 vols.) | 39 |
| Zinc oxide | 1 |
| TMTDS (tetramethyl thiuram disulfide) | 2.75 |
| N-cyclohexyl-2-benzothiazole sulfenamide | 1.50 |
| Stearic acid | 1 |

TABLE IX

| | Parts by weight |
|---|---|
| Hycar (butadiene-acrylonitrile copolymer) | 100 |
| Silica (20 vols.) | 39 |
| Di-cup (dicumyl peroxide) | 1.25 |
| Trimene base (ethyl chloride, formaldehyde and ammonia condensation product) | 1 |
| Stearic acid | 0.50 |

It will be noted that neither of these materials contains sulfur. Use of peroxide, such as dicumyl peroxide, benzoyl peroxide or like organic peroxide which is a polymerization catalyst for unsaturated double bonds, is effective in the production of transparent materials. Also, the thiuram disulfides, such as tetraethyl thiuram disulfide, tetramethyl thiuram disulfide, and like thiuram disulfides which are accelerators, are useful for this purpose.

The following is a typical recipe which is suitable for production of transparent butyl stocks:

TABLE X

| | Parts by weight |
|---|---|
| Butyl 268 (isobutylene-isoprene copolymer having low degree of unsaturation) | 100 |
| Silica | 39 |
| TMTDS | 2 |
| Organic polysulfide (VA-7) | 3 |
| Diethylene glycol | 2.5 |
| Zince stearate | 3 |

The silica used in the above recipes is prepared according to the following method:

Seventeen thousand gallons of a sodium silicate solution is placed in a 50,000-gallon tank. This solution contains the sodium silicate $Na_2O(SiO_2)_{3.3}$ in amount sufficient to establish an $Na_2O$ concentration of 20.3 grams per liter. This solution contains no sodium chloride except that minor amount (less than 0.08 percent) usually present in commercial sodium silicate. The solution is held at a temperature of 167° F.±5°. Carbon dioxide gas containing 10.0 to 10.8 percent of $CO_2$, the balance being nitrogen and air, is introduced into the solution at a gas temperature of 115 to 145° F. at a rate sufficient to provide 1250 cubic feet of the carbon dioxide gas per minute (measured at 760 millimeters pressure and 0° C.). This gas is introduced directly under a turboagitator in a manner to achieve uniform distribution of gas, and the mixture is vigorously agitated. Carbon dioxide introduction is continued at this rate for 8½ hours, at which time about 120 to 140 percent of the theoretical amount of $CO_2$ has been introduced. After this period of 8½ hours, the rate of introduction of carbon dioxide is reduced to 400 cubic feet per minute and the solution is boiled for 1½ hours. The slurry is then washed and the silica is recovered. The silica has a surface area of 140 to 150 square meters per gram.

What is claimed:

1. A transparent vulcanizate of a composition containing as essential ingredients, a rubber of the group consisting of natural rubber, butadiene-styrene copolymers, butadiene-acrylonitrile copolymers and butadiene-isobutylene copolymers, reinforced with finely divided hydrated silica having an average ultimate particle size of 0.01 to 0.05 micron and an index of refraction of 1.450 to 1.465, and a vulcanizing agent, said vulcanizate having an opacity below 50 percent said opacity measured as 100 times the ratio of green light reflectance from a 0.075 inch sheet of said rubber over a black background to the reflectance obtained from said sheet over a white background.

2. A vulcanizate of a composition containing as essential ingredients, a naphthenic oil-extended synthetic rubber-like copolymer of butadiene and styrene, said oil having an index of refraction of substantially 1.450 to 1.465, reinforced with a finely divided, hydrated silica having an average ultimate particle size of 0.01 to 0.05 micron and an index of refraction of 1.450 to 1.465, and a vulcanizing agent, said vulcanizate having an opacity below 50 percent said opacity measured as 100 times the ratio of green light reflectance from a 0.075 inch sheet of said rubber over a black background to the reflectance obtained from said sheet over a white background.

3. A transparent vulcanizate of a composition containing as essential ingredients, natural rubber reinforced with, finely divided hydrated silica having an average ultimate particle size of 0.01 to 0.05 micron and an index of refraction of 1.450 to 1.465, and 0.5 to 2 parts by weight of sulfur per 100 parts by weight of rubber, and enough liquid organic polysulfide vulcanizing agent to ensure cure of the vulcanizate, said vulcanizate having an opacity below 50 percent said opacity measured as 100 times the ratio of green light reflectance from a 0.075 inch sheet of said rubber over a black background to the reflectance obtained from said sheet over a white background.

4. A transparent vulcanizate of a composition containing as essential ingredients, natural rubber reinforced with finely divided hydrated silica having an average ultimate particle size of 0.02 to 0.025 micron and having an index of refraction of 1.450 to 1.465, and 0.5 to 2 parts by weight of sulphur per 100 parts by weight of rubber, said vulcanizate having an opacity below 50 percent said opacity measured as 100 times the ratio of green light reflectance from a 0.075 inch sheet of said rubber over a black background to the reflectance obtained from said sheet over a white background.

5. A transparent vulcanizate of a composition containing as essential ingredients, natural rubber reinforced with finely divided hydrated silica having an average ultimate particle size of 0.02 to 0.025 micron and having an index of refraction of 1.450 to 1.465, 0.5 to 2 parts by weight of sulphur per 100 parts by weight of rubber, and 0.5 to 1.5 parts by weight of finely divided zinc oxide per 100 parts by weight of rubber, said vulcanizate having an opacity below 50 percent said opacity measured as 100 times the ratio of green light reflectance from a 0.075 inch sheet of said rubber over a black background to the reflectance obtained from said sheet over a white background.

6. The vulcanizate of claim 2 wherein the vulcanizate contains 0.5 to 2 parts by weight of sulphur and 0.5 to 1.5 parts by weight of finely divided zinc oxide per 100 parts by weight of rubber.

7. A transparent vulcanizate of a composition containing as essential ingredients, natural rubber reinforced with finely divided, hydrated silica having an average ultimate particle size of 0.02 to 0.025 microns and having an index of refraction of 1.450 to 1.465 and 0.5 to 2 parts by weight of sulphur per 100 parts by weight of rubber, a small amount of a thiazole accelerator, a small amount of an amine activator, and 0.5 to 1.5 parts by weight of finely divided zinc oxide per 100 parts by weight of rubber said opacity measured as 100 times the ratio of green light reflectance from a 0.075 inch sheet of said rubber over a black background to the reflectance obtained from said sheet over a white background.

8. The vulcanizate of claim 7 wherein the composition also contains a thiocarbamate accelerator.

9. The vulcanizate of claim 2 wherein the silica has a surface area of 140 to 150 square meters per gram.

10. The vulcanizate of claim 7 wherein the silica has a surface area of 140 to 150 square meters per gram.

11. A transparent vulcanizate of a composition containing as essential ingredients a butadiene-styrene copolymer reinforced with finely divided hydrated silica having an average ultimate particle size of 0.02 to 0.025 micron and having an index of refraction of 1.450 to 1.465, and 0.5 to 2 parts by weight of sulphur per 100 parts by weight of rubber, said vulcanizate having an opacity below 50 percent, said opacity measured as 100 times the ratio of green light reflectance from a 0.075 inch sheet of said rubber over a black background to the reflectance obtained from said sheet over a white background.

12. A transparent vulcanizate of a composition containing as essential ingredients a butadiene-styrene copolymer reinforced with finely divided hydrated silica having an average ultimate particle size of 0.02 to 0.025 micron and having an index of refraction of 1.450 to 1.465, 0.5 to 2 parts by weight of sulphur per 100 parts by weight of rubber, and 0.5 to 1.5 parts by weight of finely divided zinc oxide per 100 parts by weight of rubber, said vulcanizate having an opacity below 50 percent, said opacity measured as 100 times the ratio of green light reflectance from a 0.075 inch sheet of said rubber over a black background to the reflectance ob-obtained from said sheet over a white background.

13. A transparent vulcanizate of a composition containing as essential ingredients a butadiene-styrene copolymer reinforced with finely divided, hydrated silica having an average ultimate particle size of 0.02 to 0.025 microns and having an index of refraction of 1.450 to 1.465; 0.5 to 2 parts by weight of sulphur per 100 parts by weight of rubber, a small amount of a thiazole accelerator, a small amount of an amine activator, and 0.5 to 1.5 parts by weight of finely divided zinc oxide per 100 parts by weight of rubber said opacity measured as 100 times the ratio of green light reflectance from a 0.075 inch sheet of said rubber over a black background to the reflectance obtained from said sheet over a white background.

References Cited in the file of this patent

UNITED STATES PATENTS

| | | |
|---|---|---|
| 2,597,872 | Iller | May 27, 1952 |
| 2,702,286 | Iknayan | Feb. 15, 1955 |
| 2,865,882 | Strassburg | Dec. 23, 1958 |